(12) United States Patent
Shapiro et al.

(10) Patent No.: US 10,850,760 B2
(45) Date of Patent: Dec. 1, 2020

(54) FOLDABLE WHEELED CARRIER INCLUDING WHEEL FOLDING ACTUATION HANDLE

(71) Applicants: Richard Neal Shapiro, Virginia Beach, VA (US); Gordon Liao, Tainan (TW); Thomas Reiter, Vienna (AT)

(72) Inventors: Richard Neal Shapiro, Virginia Beach, VA (US); Gordon Liao, Tainan (TW); Thomas Reiter, Vienna (AT)

(*) Notice: Subject to any disclaimer, the term of this patent is extended or adjusted under 35 U.S.C. 154(b) by 14 days.

(21) Appl. No.: 15/227,948

(22) Filed: Aug. 3, 2016

(65) Prior Publication Data
US 2020/0001909 A1    Jan. 2, 2020

(51) Int. Cl.
| | |
|---|---|
| *B62B 7/10* | (2006.01) |
| *B62B 3/02* | (2006.01) |
| *B62B 7/14* | (2006.01) |
| *B62B 7/08* | (2006.01) |

(52) U.S. Cl.
CPC ............ *B62B 7/10* (2013.01); *B62B 3/022* (2013.01); *B62B 7/083* (2013.01); *B62B 7/14* (2013.01); *B62B 2205/12* (2013.01)

(58) Field of Classification Search
CPC .. B62B 7/14; B62B 7/10; B62B 7/083; B62B 3/022; B62B 2205/003; B62B 2205/12; B62B 2205/14; B62B 2205/26
See application file for complete search history.

(56) References Cited

U.S. PATENT DOCUMENTS

| | | | |
|---|---|---|---|
| 1,124,151 A | * 1/1915 | Lloyd | B62B 7/10 |
| | | | 280/39 |
| 4,315,632 A | * 2/1982 | Taylor | B62B 1/12 |
| | | | 280/40 |
| 4,362,307 A | * 12/1982 | Nakatani | A45F 3/08 |
| | | | 224/153 |
| 4,953,880 A | 9/1990 | Sudakoff | |
| 5,072,958 A | 12/1991 | Young | |
| 5,558,357 A | 9/1996 | Wang | |
| 5,647,601 A | 7/1997 | Potter | |
| 6,220,611 B1 | 4/2001 | Shapiro | |
| 6,402,166 B1 | 6/2002 | Chiu | |

(Continued)

FOREIGN PATENT DOCUMENTS

| | | | |
|---|---|---|---|
| CN | 103448778 A | * | 12/2013 |
| CN | 103448778 A | | 12/2013 |

(Continued)

*Primary Examiner* — James A Shriver, II
*Assistant Examiner* — Steve Clemmons

(57) ABSTRACT

A wheeled carrier device such as a baby stroller, golf cart, child carrier, or general carrier or cargo cart, comprising a bottom frame with at least two rear wheels and at least one front wheel, and may include a movably mounted upper carrier frame with a selectively removable, adjustable and/or reversible carrying element which may include child seating, with a unique wheel folding mechanism that interconnects all the wheels, so that simple movement of a wheel folding grasp synchronously moves all the wheels between the operative, rolling position and their stowed fold flat positions parallel with the bottom frame, with the wheel folding mechanism operable independently of collapsing movement of an optional upper carrier frame which also folds flat and parallel with the bottom frame.

19 Claims, 10 Drawing Sheets

(56) References Cited

U.S. PATENT DOCUMENTS

| | | | |
|---|---|---|---|
| 6,581,945 B1 * | 6/2003 | Shapiro | B62B 1/206 280/30 |
| 6,607,207 B2 * | 8/2003 | Shapiro | B62K 9/00 280/261 |
| 6,729,647 B2 | 5/2004 | Shapiro et al. | |
| 6,733,026 B1 | 5/2004 | Robberson et al. | |
| 6,845,991 B1 | 1/2005 | Ritucci et al. | |
| 6,893,030 B2 | 5/2005 | Shapiro | |
| 6,916,028 B2 | 7/2005 | Shapiro | |
| 6,974,150 B2 | 12/2005 | Santamaria | |
| 6,991,249 B2 | 1/2006 | Shapiro | |
| 7,000,928 B2 | 2/2006 | Liao | |
| 7,066,485 B2 | 6/2006 | Shapiro | |
| 7,073,801 B2 | 7/2006 | Sanders et al. | |
| 7,077,420 B1 | 7/2006 | Santoski | |
| 7,100,929 B2 | 9/2006 | Shapiro et al. | |
| 7,118,115 B2 | 10/2006 | Abel | |
| 7,137,644 B2 | 11/2006 | Kimberley | |
| 7,201,385 B2 | 4/2007 | Renz et al. | |
| 7,246,805 B2 | 7/2007 | Neal | |
| 7,264,265 B2 | 9/2007 | Shapiro | |
| 7,360,784 B2 | 4/2008 | Stewart et al. | |
| 7,591,479 B2 | 9/2009 | Gollas | |
| 7,770,912 B2 | 8/2010 | Liao | |
| 7,819,408 B2 | 10/2010 | Shapiro | |
| 7,832,756 B2 | 11/2010 | Storm | |
| 7,866,685 B2 | 1/2011 | Liao | |
| D632,040 S | 2/2011 | Liao | |
| 7,883,104 B2 | 2/2011 | Driessen | |
| 8,091,916 B2 | 1/2012 | Shapiro | |
| 8,128,104 B2 | 3/2012 | Liao | |
| 8,152,179 B2 * | 4/2012 | Yang | A61G 5/08 280/38 |
| 8,191,920 B2 | 6/2012 | Zhang | |
| 8,282,121 B2 | 10/2012 | Lin | |
| 8,342,562 B2 * | 1/2013 | Chaudeurge | B60B 33/0039 280/642 |
| 8,474,833 B2 | 7/2013 | Shapiro | |
| 8,500,140 B1 * | 8/2013 | Liao | B62B 7/10 280/38 |
| 8,544,871 B1 * | 10/2013 | Liao | B62B 3/02 280/62 |
| 8,602,444 B2 * | 12/2013 | Chang | B62B 1/12 280/651 |
| 8,695,999 B2 * | 4/2014 | Von Bismarck | A45C 5/146 280/87.041 |
| 8,979,098 B2 | 3/2015 | Wang | |
| 9,010,770 B2 | 4/2015 | Cantrell | |
| 9,096,249 B2 * | 8/2015 | Gibson | B62B 1/002 |
| 9,193,368 B2 | 11/2015 | Shapiro | |
| 9,227,649 B2 * | 1/2016 | Wu | B62B 7/044 |
| 9,233,704 B2 * | 1/2016 | Wu | B62B 7/083 |
| 9,283,977 B2 * | 3/2016 | Wu | B62B 7/08 |
| 9,616,907 B1 * | 4/2017 | Gibson | B62B 1/12 |
| 9,764,752 B2 * | 9/2017 | Liao | B62B 3/025 |
| 9,975,566 B2 * | 5/2018 | Herbault | B62B 7/08 |
| 10,118,633 B2 * | 11/2018 | Gibson | B62B 1/002 |
| 2006/0192366 A1 | 8/2006 | Kimberley | |
| 2007/0096434 A1 * | 5/2007 | Haeggberg | B62B 7/08 280/642 |
| 2009/0066056 A1 | 3/2009 | Liao | |
| 2009/0115168 A1 | 5/2009 | Liao | |
| 2010/0176577 A1 | 7/2010 | Liao | |
| 2010/0225093 A1 | 9/2010 | Lin | |
| 2011/0316258 A1 | 12/2011 | Lin | |
| 2012/0086189 A1 | 4/2012 | Wu | |
| 2013/0113185 A1 * | 5/2013 | Zehfuss | B62B 7/062 280/647 |
| 2014/0183832 A1 * | 7/2014 | Wang | B62B 3/022 280/39 |
| 2014/0306428 A1 * | 10/2014 | Herbault | B62B 3/022 280/647 |
| 2016/0185374 A1 * | 6/2016 | Zhang | B62B 3/02 280/651 |

FOREIGN PATENT DOCUMENTS

| | | | |
|---|---|---|---|
| DE | 202005019055 | 2/2006 | |
| DE | 202005019055 U1 * | 2/2006 | B62B 7/04 |
| GB | 424204 A * | 2/1935 | B62B 7/10 |
| GB | 639439 | 6/1950 | |
| GB | 639439 A * | 6/1950 | A61G 5/0891 |
| WO | WO-2007025551 A1 * | 3/2007 | B62B 7/10 |

* cited by examiner

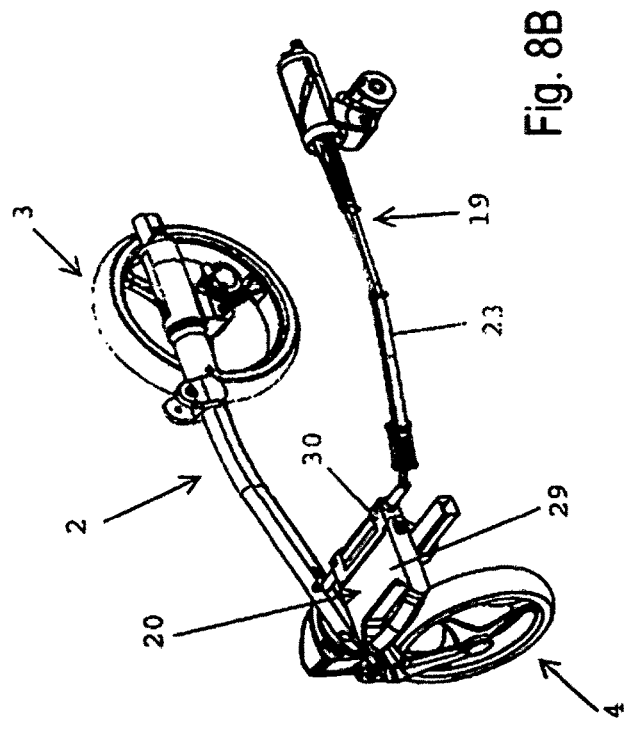
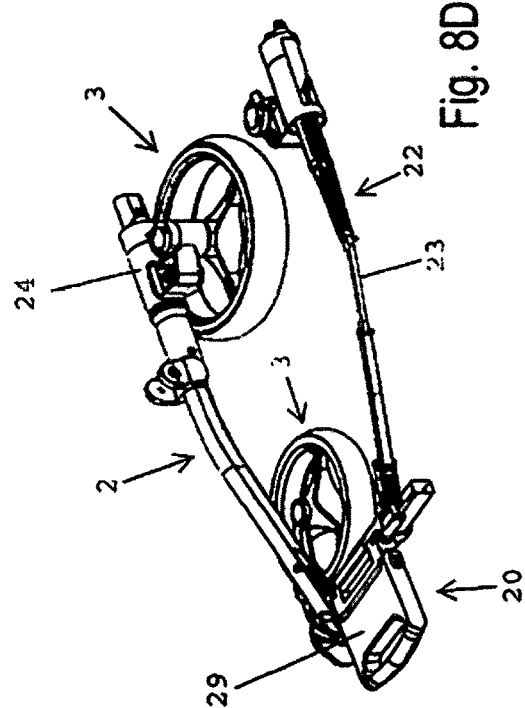
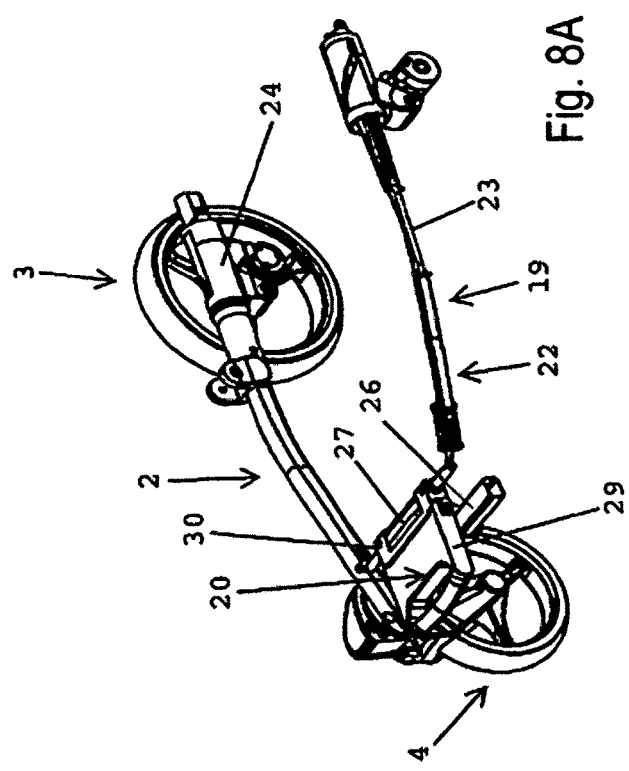
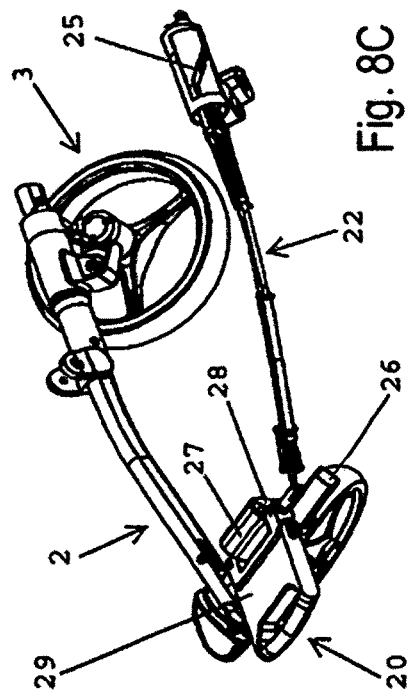

FOLDABLE WHEELED CARRIER INCLUDING WHEEL FOLDING ACTUATION HANDLE

RELATIONSHIP TO OTHER APPLICATIONS

This application claims priority of a prior European patent application 15180201.4/EP15180201 filed Aug. 7, 2015 filed by the co-inventors.

FIELD OF THE INVENTION

The present invention relates to a cart or wheeled carrier device (usable as a baby stroller, jogging stroller, golf carrier, child carrier, or any general cargo retaining cart), which in one embodiment may embody a baby stroller, comprising a bottom frame, at least two back or rear wheels and at least one front wheel mounted to the bottom frame, an upper carrier frame mounted to the bottom frame, the upper carrier frame being arranged for carrying a carrier element, such as a child seat, a collapsing mechanism for bringing the upper carrier frame from a carrying position into a collapsed position and a folding mechanism for folding the at least two back or rear wheels and the at least one front wheel from an operative or drive position into a stowed position.

BACKGROUND OF THE INVENTION

In the prior art, a great variety of manually operated carts have been proposed. For example, a perambulator has been described in WO 2007/025551A1. The known perambulator comprises a chassis unit with a rectangular bottom frame. The bottom frame comprises two parallel lateral profiles that are connected to end profiles by means of hinge fittings. A carrier frame for a cot is mounted on the chassis unit. The carrier frame comprises lateral legs connected to the hinge fittings of the bottom frame. When the legs of the carrier frame are turned clockwise about the hinge fittings, the lateral profiles of the bottom frame are rotated using wires, whereby the wheels mounted on the lateral profiles are able to turn by 90 degrees. In this way, the wheels are folded inwards to lie underneath the collapsed perambulator.

The known construction entails the drawback that the folding of the wheels is coupled to the collapsing of the carrier frame. Thus, the wheels may only be arranged flat on the underside of the perambulator if the upper carrier frame is collapsed onto the bottom frame. It is a further drawback of the known art that the folding of the wheels inwards is rather complicated and requires significant hand force.

SUMMARY OF THE INVENTION

The object of the present invention is to alleviate at least some of the drawbacks of the prior art. It is thus an object of the invention to provide a cart as mentioned initially with a simple, reliable folding mechanism that gives a high degree of flexibility to the user of the cart.

The cart of the present invention is characterized in that the folding mechanism comprises an operating handle separate from the bottom carrier frame such that the at least two back wheels and the at least one front wheel may be folded into the stow position independently of the collapsing mechanism for bringing the upper carrier frame into the collapsed position.

Thus, the invention provides for a manually manipulable operating handle which is separate from the carrier frame for the carrying element. The operating handle (wheel folding grasp) does not constitute an element of the carrier frame or of the carrying element movable between the carrying and the collapsed state. In this way, the wheel folding mechanism may be activated independently of the collapsing mechanism or carrying element. Thus, the front and back wheels may be arranged in either of the drive position or stow position using the operating handle, while the upper carrier frame may be positioned in either of the carrying or collapsed position (or any intermediary position between the carrying and the collapsed position).

Furthermore, the wheel folding operating handle is separate from the at least two rear wheels and the at least one front wheel. This construction facilitates actuation of the cart. Also, the user does not need to touch soiled wheels for operating the folding mechanism. In particular, the front and back wheels may be folded inwards from the drive position to lie flat on the underside of the bottom frame, whereas the upper carrier frame is retained in the carrying position. Alternatively, the folding or unfolding of the front and back wheels may be effected in the collapsed position of the upper carrier frame. In the present invention, the front and back wheels may be folded or unfolded simultaneously, with a single actuation of the operating handle. Preferably, the rear or back wheels pivot by an angle of approximately 90 degrees between the drive and stow position about axes (and each wheel's axis of rotation) essentially parallel to a longitudinal axis of the cart (which is the direction of a straight movement of the cart in the drive position). The at least one front wheel preferably undergoes a two-stage folding process starting from the drive position. First, the at least one front wheel is pivoted into an intermediary position in which the at least one front wheel is arranged essentially perpendicularly to the longitudinal axis of the cart.

Second, the at least one front wheel is pivoted about a transverse axis, which is essentially perpendicular to the longitudinal axis of the cart, into the stow position. In the carrying position, a carrying element, for example a child seat or cot, may be arranged on the carrier frame. Preferably, the mounting of the carrying element on the carrier frame is releasable such that the carrying element may be simply removed prior to collapsing the carrier frame. In the collapsed position, the carrier frame may lie flat on the upper side of the bottom or chassis frame of the cart. This construction entails maximum flexibility and adaptability. The operating handle is particularly simple to use. Furthermore, the operating handle may be specifically designed to manipulate the folding mechanism, whereas the operating handle does need not contribute to the support of the carrying element. As a result, a particularly durable construction may be achieved.

In a particularly preferred embodiment, the wheel folding operating handle is a push-and-pull handle being linearly movable, preferably in a main plane of the bottom frame. In this embodiment, a user may pull the push-and-pull handle to simultaneously transfer the front and back wheels into the stow position, in which the front and back wheels lie flat at the underside of the bottom frame. In the same fashion, the user may push the push-and-pull handle to unfold the back and front wheels into the drive position, in which the back and front wheels may roll on a plain ground. The push-and-pull handle is particularly easy to operate, may be easily integrated into the construction of the cart, takes little space and enables powerful force transmission. Preferably, the push-and-pull handle may be moved along a linear path in the main plane of the bottom frame, in particular in an essentially horizontal plane with respect to the drive position with the back and front wheels supported on the floor.

In a less preferred embodiment, the operating handle is a lever pivotable about an axis to transfer the at least two back wheels and the at least one front wheel from the drive position into the stow position. For folding and unfolding the back and front wheels through actuation of the operating handle, it is preferred if the folding mechanism comprises a force transmitting device connected to the operating handle and the at least two back wheels, respectively, the force transmitting device preferably comprising tie rods. The force transmitting device is arranged for transmitting the force applied by the user on the operating handle to the back wheels to simultaneously fold and unfold the back wheels. Preferably, the force transmitting device comprises rigid tie rods, which are movable along linear paths to pivot the back wheels. By using tie rods, both the folding and unfolding of the back wheels may be accomplished if needed.

In a particularly preferred embodiment, the folding mechanism comprises sleeve elements connected to the at least two back wheels, the sleeve elements having first guide rails for sliding elements connected to the tie rods for converting an actuation of the operating handle into a swiveling motion of the at least two back wheels. The sleeve elements may be rigidly connected to bearings of the back wheels. Preferably, rear ends of the tie rods are inserted into the sleeve elements. In operation, the sliding elements on the tie rods slide along the first guide rails of the sleeve elements. The first guide rails are arranged such that the linear movements of the tie rods carrying the sliding elements are converted into swiveling motions of the back wheels. Preferably, the back wheels are pivoted by an angle of approximately 90° between the drive position and the stow position.

For simultaneously folding and unfolding the back wheels it is preferred if the push-and-pull handle is mounted on a transverse rod extending essentially perpendicularly to the direction of the pushing or pulling of the push-and-pull handle. In this way, a movement of the push-and-pull handle along the longitudinal axis of the cart may be transferred to the two tie rods connected to the two back wheels. In view of folding or unfolding the at least one front wheel simultaneously with folding or unfolding the at least two back wheels, the folding mechanism comprises an intermediary member arranged between the operating handle and the at least one front wheel, the intermediary member preferably having a second guide rail for guiding a slider connected to the operating handle for converting an actuation of the operating handle into a swiveling motion of the at least one front wheel. Preferably, the slider is the transverse rod on which the operating handle is mounted. The operating handle may have an opening for accommodating the intermediary member.

For facilitating the actuation of the folding mechanism, the push-and-pull handle preferably comprises a handhold member and a mounting member mounted on the bottom frame, the handhold member being pivotably mounted on the mounting element. While the mounting member may be linearly moved in the longitudinal direction of the cart during folding or unfolding the back and front wheels, the handhold member may be pivoted about an axis, which preferably extends essentially perpendicularly to the linear movement of the mounting element.

For obtaining a stable but light-weight construction it is advantageous if the bottom frame comprises two lateral frame members and two transverse frame members connecting the two lateral frame members. Preferably, the lateral frame members and the transverse frame members are formed by hollow profile elements. In this way, elements of the force transmitting device between the operating handle and the wheels, in particular the tie rods mentioned before, may be housed inside the profile elements of the bottom frame.

For easy operation of the folding mechanism, it is preferred if the operating handle is arranged at a front end of the bottom frame, preferably between two front wheels.

In a particularly advantageous embodiment, the carrier frame comprises a circumferential frame element and at least one support frame element, the at least one support frame element in the carrying position supporting the circumferential frame element from below, the circumferential frame element and the at least one support frame element preferably being arranged essentially in parallel to a main plane of the bottom frame in the collapsed position of the carrier frame. Preferably, two support frame elements are mounted on two lateral frame members of the bottom frame, each support frame element supporting a lateral section of the circumferential frame element. Preferably, the circumferential frame element, in the carrying position, is oval or rectangular in top view.

The collapsing mechanism preferably comprises a first hinge between a first and a second frame part of the circumferential frame element and/or a second hinge between a first and a second portion of the support frame element. For collapsing the carrier frame, the first and second frame part of the circumferential frame element may be pivoted against each other by means of the first hinge. Preferably, in the carrying position, the first and second frame part of the circumferential frame element extend in the same plane, which preferably is inclined with respect to the main plane of the bottom frame (i.e. a horizontal plane when viewed in the drive position on the ground). In a similar fashion, the first and second portion of the support frame element may be pivoted against each other by means of the second hinge. Preferably, the first portion of the support frame element extends the second portion of the support frame element in the carrying position. In the collapsed position, the first portion and the second portion of the support frame element are folded onto each other.

Preferably, the at least two back wheels and the at least one front wheel are arranged essentially in parallel to a main plane of the bottom frame in the stow position. Thus, the at least one front wheel and at least two back wheels in the stow position lie flat below the underside of the bottom frame.

For actuating the folding mechanism without the need to overcome the friction between the wheels and the floor, a preferred embodiment provides for at least one foot element mounted on the bottom frame, in particular on a rear transverse frame member of the bottom frame, for retaining the cart in an upright position supported by the at least one foot element. Preferably, the cart is retained in the upright position solely by the foot elements, independently of the front or back wheels which are lifted off the ground. In the upright position, the folding mechanism may be actuated such that the front and back wheels freely fold into the stow position or unfold into the drive position.

BRIEF DESCRIPTION OF THE DRAWINGS

Preferred embodiments of the invention are further explained with respect to the drawings, without limiting the invention thereto. In the drawings:

FIG. 1 together with FIG. 7 are the preferred cover figures;

FIGS. 8a to 8d are perspective views of the folding mechanism for folding the rear and front wheels;

DESCRIPTION OF THE PREFERRED EMBODIMENTS

FIGS. 1 to 7 show a manually operable wheeled carrier device, wagon or cart 1, which, in the shown embodiment, is a baby stroller embodiment. With certain modifications readily comprehensible to the person skilled in the art, carrier or cart 1 could also be a golf cart, game or cargo carrier, child carrier or the like. The words "carrier" and "cart" may be used interchangeably and synonymously throughout this application.

Figure 2:
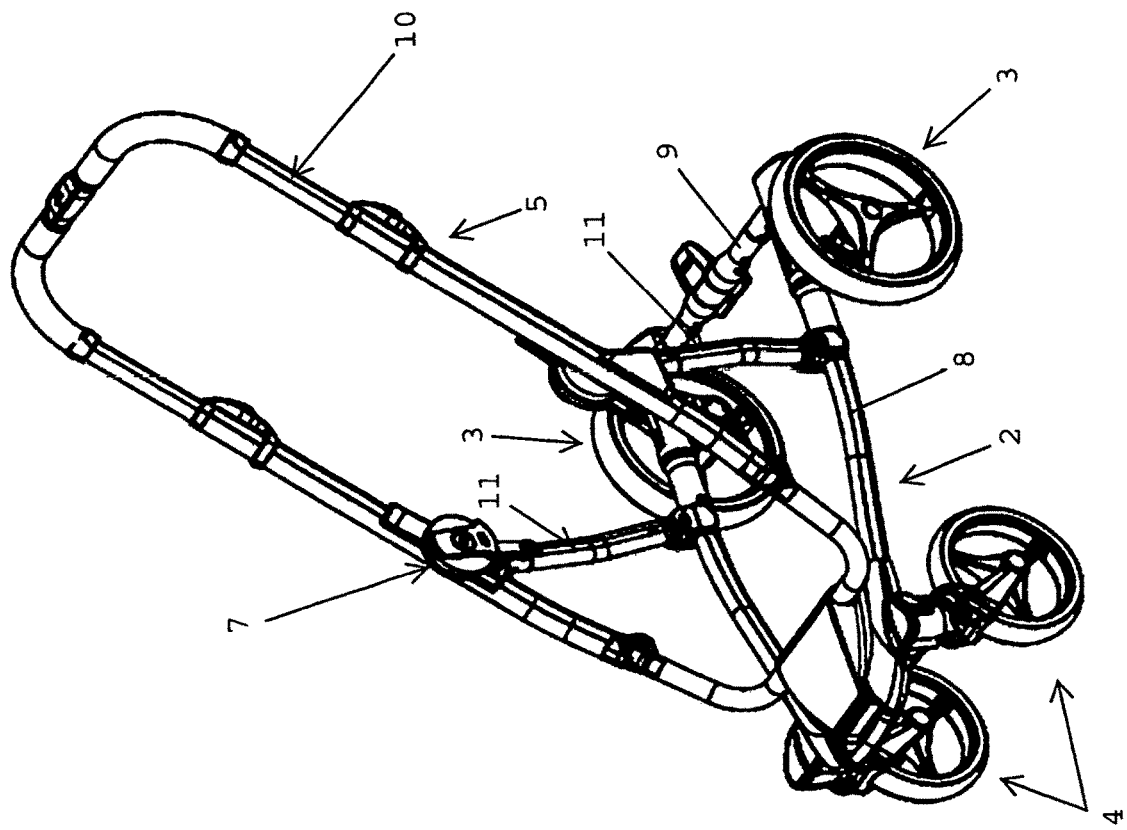
FIG. 2 is a perspective view of the baby stroller of FIG. 1, yet without the carrying element child seat.
Figure 1:
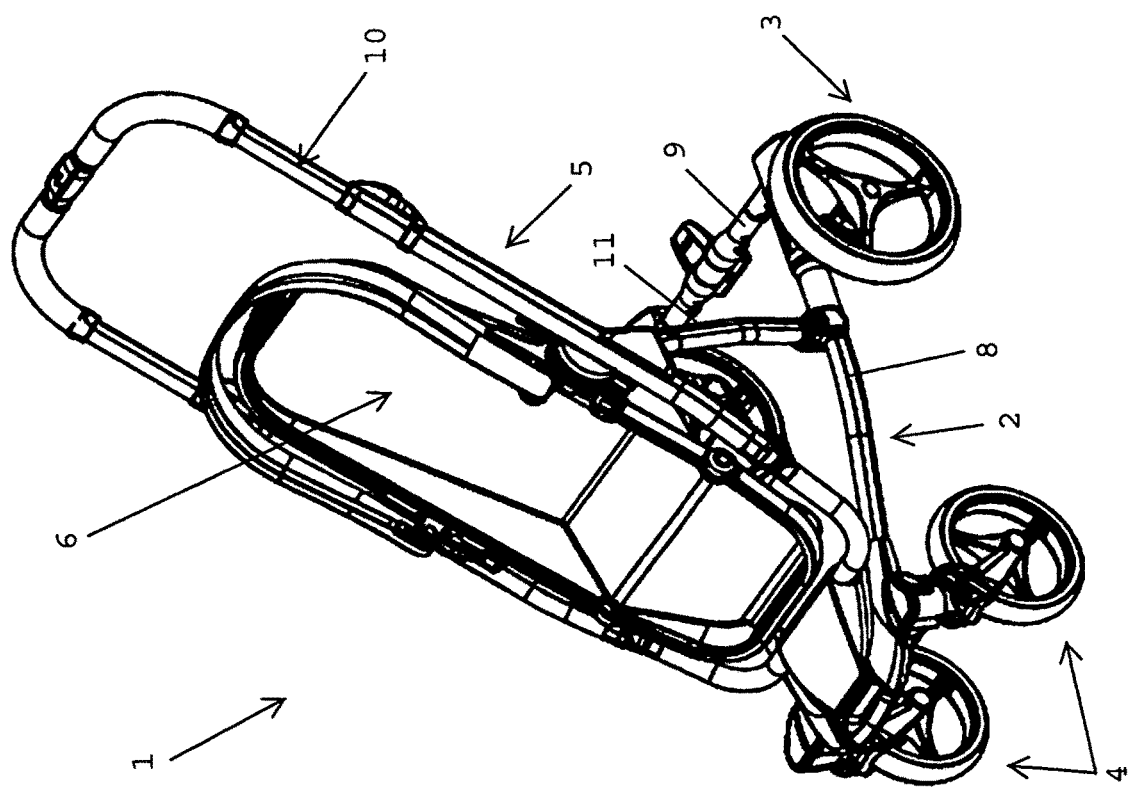
FIG. 1 is a perspective view of a baby stroller according to the invention, having a bottom frame with front and back wheels, an upper carrier frame and a child seat carrying element mounted to the upper carrier frame.

As can be seen from FIGS. 1 and 2, cart 1 comprises a bottom frame 2. Two back wheels 3 and two front wheels 4 are mounted to the bottom frame 2. Cart 1 could also only have one front wheel 4. A carrier frame 5 is mounted to the bottom frame 2. A carrier element, in the present embodiment a child seat 6, is releasably attached to carrier frame 5. FIG. 1 shows cart 1 with attached child seat 6. In FIG. 2, child seat 6 was detached from child seat mounts 7. In the shown drive position of cart 1 supported on the ground, front wheels 2 may pivot about a vertical axis for steering cart 1, as is known in the prior art.

As can be seen from FIGS. 1 and 2, the bottom frame 2 comprises two lateral (side) frame members 8 and two transverse frame members 9 connecting the two lateral frame members 8. In the shown drive position, lateral frame members 8 and transverse frame members 9 are arranged in a horizontal plane parallel to the ground on which back wheels 3 and front wheels 4 are supported. The upper carrier frame 5 in one embodiment comprises a circumferential frame element 10 and two support frame elements 11, the two support frame elements 11 supporting the circumferential frame element 10 from the underside thereof.

Figure 3:
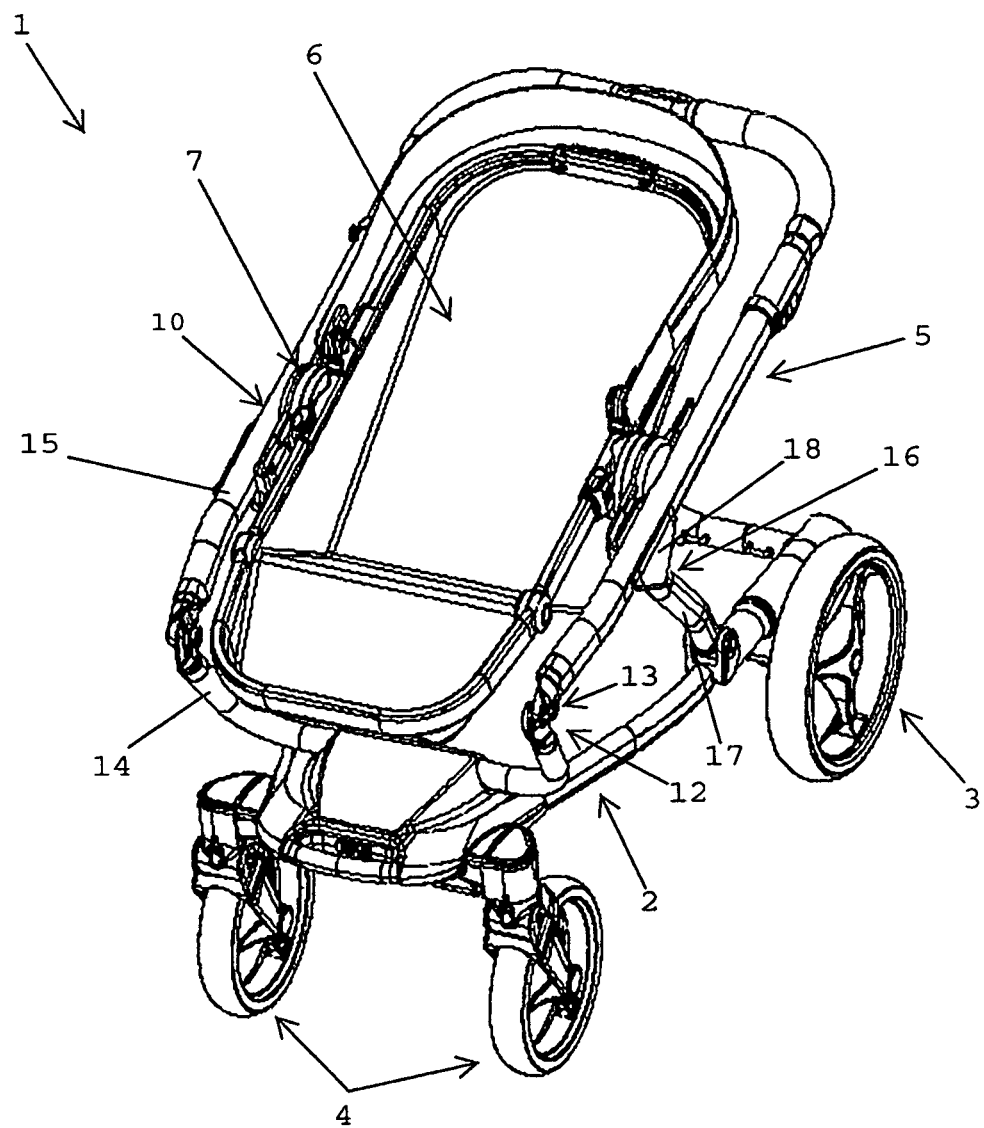
FIG. 3 is a perspective view of the baby stroller of FIGS. 1, 2 during collapsing of the carrier.
Figure 4:
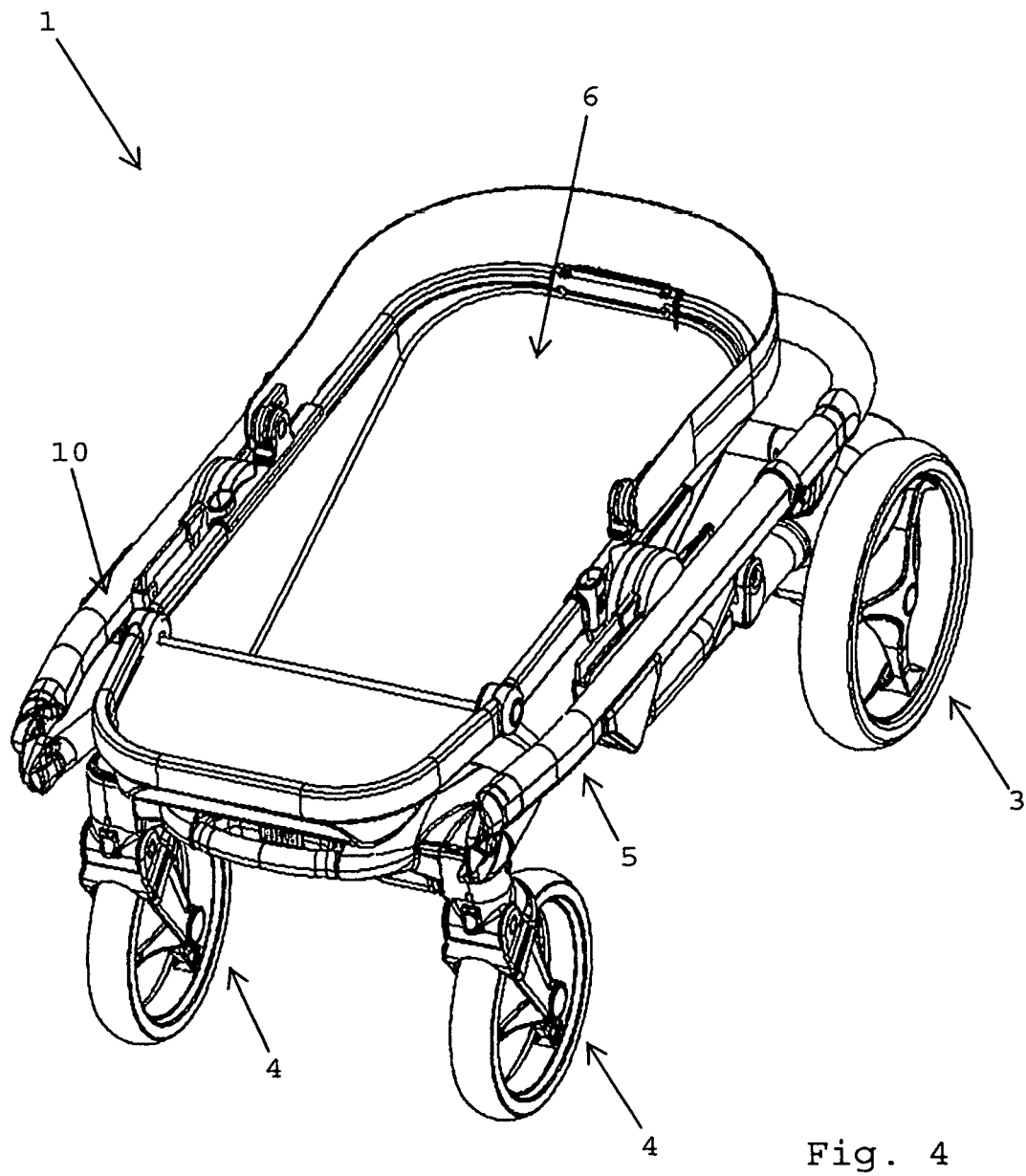
FIG. 4 is a perspective view of the baby stroller of FIGS. 1 to 3 in the collapsed position of the carrier bottom and upper frames.

As can be seen from FIGS. 3 and 4, cart 1 comprises a collapsing mechanism 12, which is arranged for transferring the upper carrier frame 5 from a carrying position (see FIGS. 1 and 2) into a collapsed position (see FIG. 4) through a series of partly collapsed positions (see FIG. 3). The collapsing mechanism 12 comprises a first hinge 13 between a first 14 and a second frame part 15 of the circumferential frame element 10. The collapsing mechanism 12 further comprises a second hinge 16 between a first 17 and a second portion 18 of each support frame element 11. The circumferential frame element 10 and the support frame elements 11 are arranged essentially in parallel to a main plane of the bottom frame in the collapsed position of the carrier frame 5.

Figure 5:
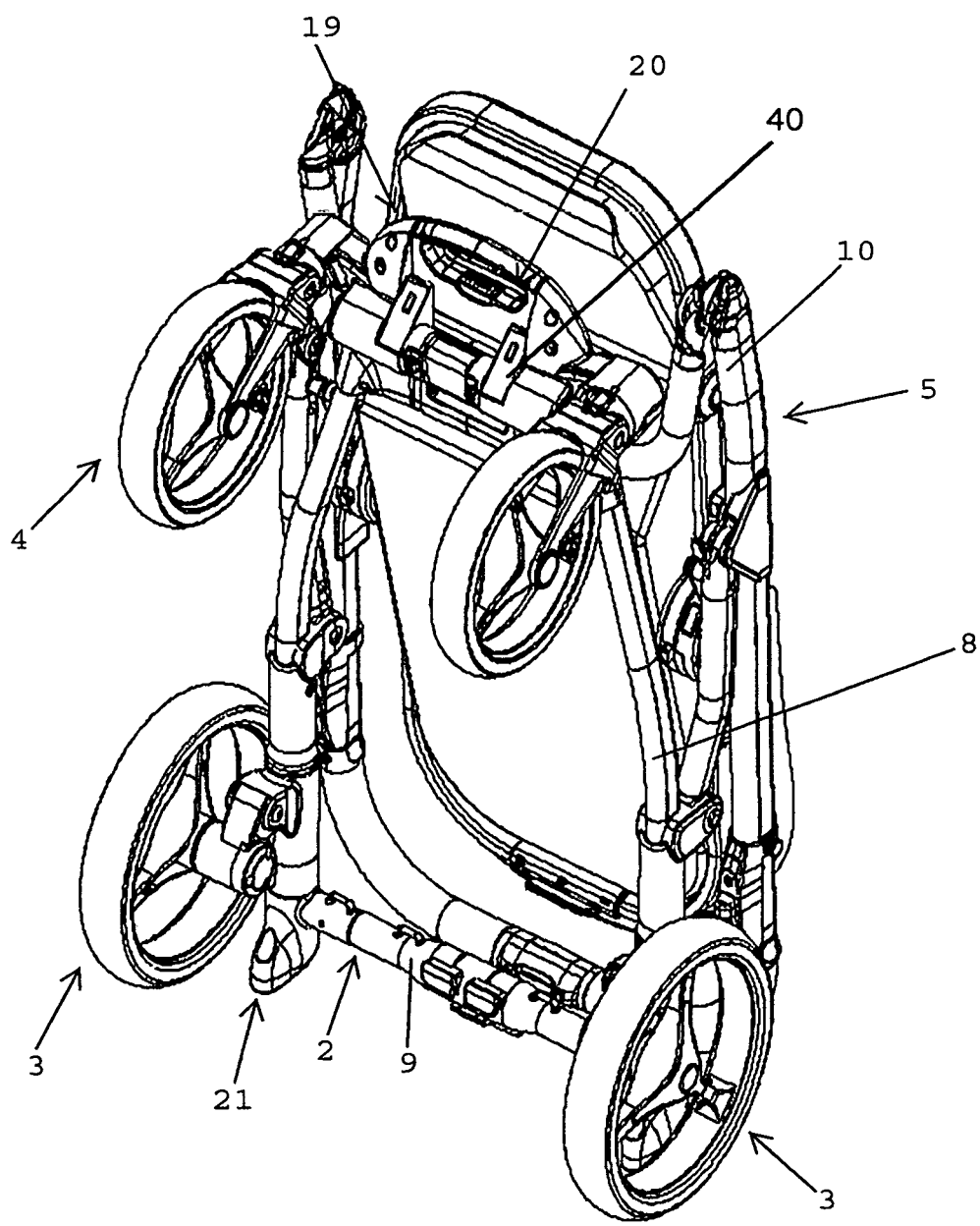
FIG. 5 is a perspective view of a further baby stroller according to the invention in an upright position supported by foot elements mounted on the bottom frame.
Figure 6:
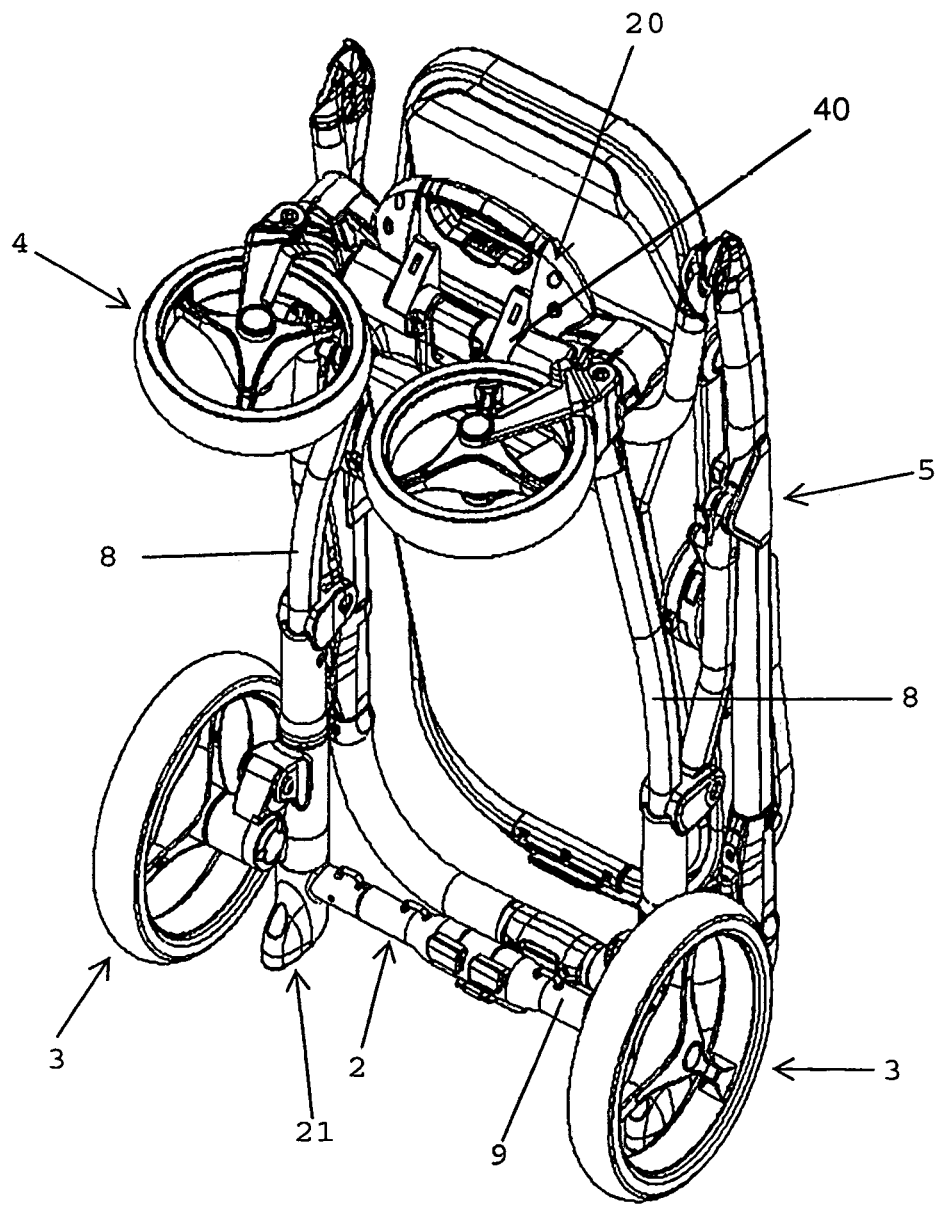
FIG. 6 is a perspective view of the baby stroller of FIG. 5 with the front wheels pivoted by 90° into an intermediary position for preparation of the folding of the front wheels.
Figure 7:
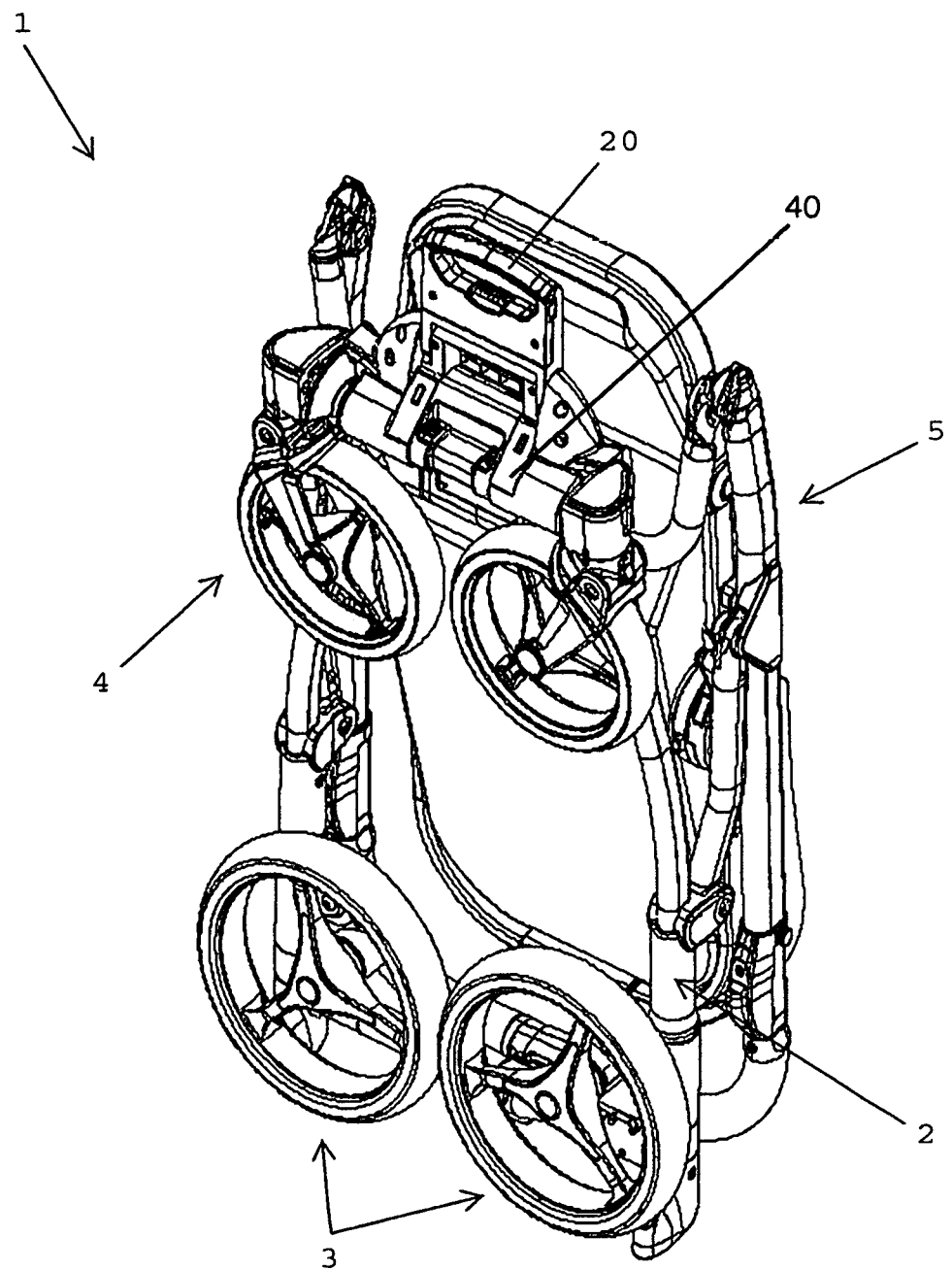
FIG. 7 is a perspective view of the baby stroller of FIGS. 5, 6 with the front wheels and the back wheels folded into a flat stow position below the bottom frame, forming a carrier frame perimeter and a fully folded side elevational profile of the device.
Figure 9:
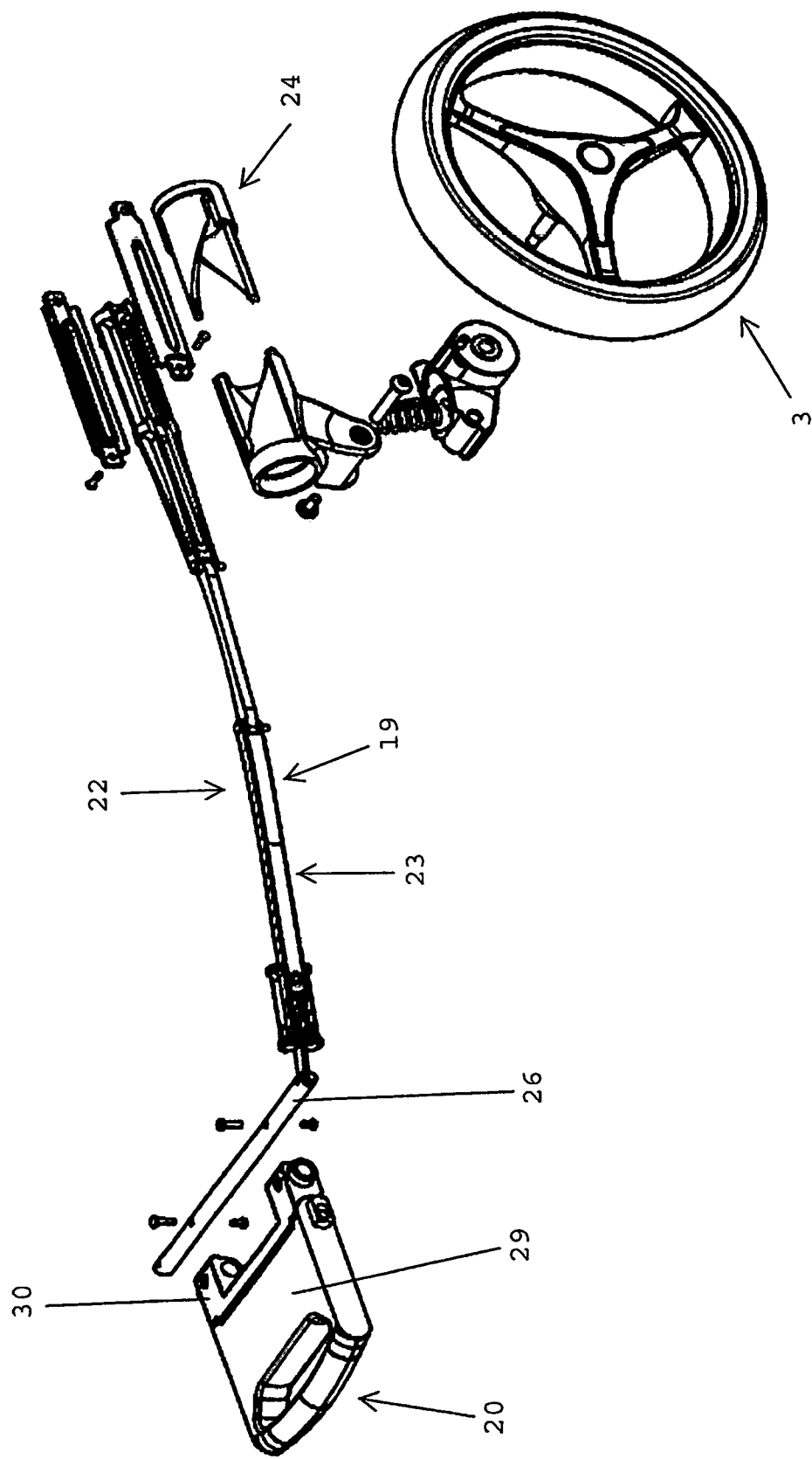
FIG. 9 is an exploded view of the wheel folding mechanism of FIGS. 8a to 8d.
Figure 10A:
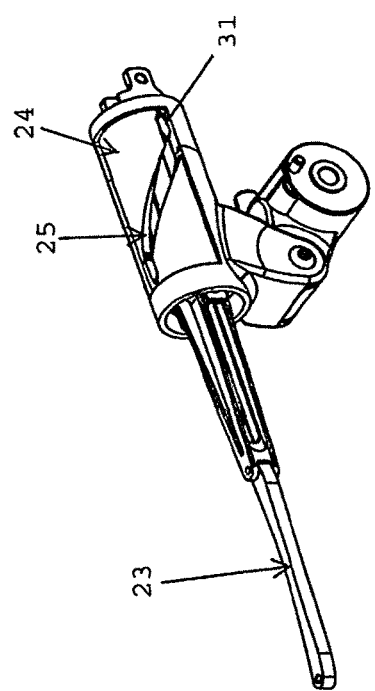
FIGS. 10a to 10c are detail views of elements of the wheel folding mechanism of FIGS. 8 and 9.
Figure 10B:
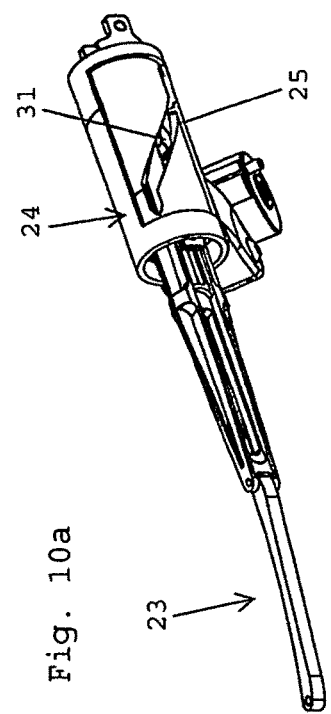
Figure 10C:
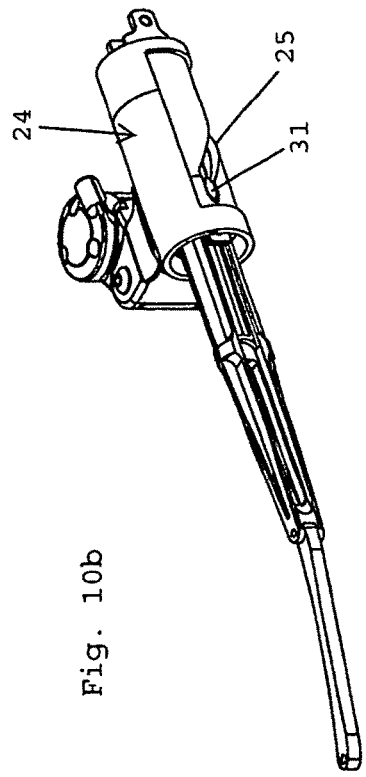
Figure 11C:
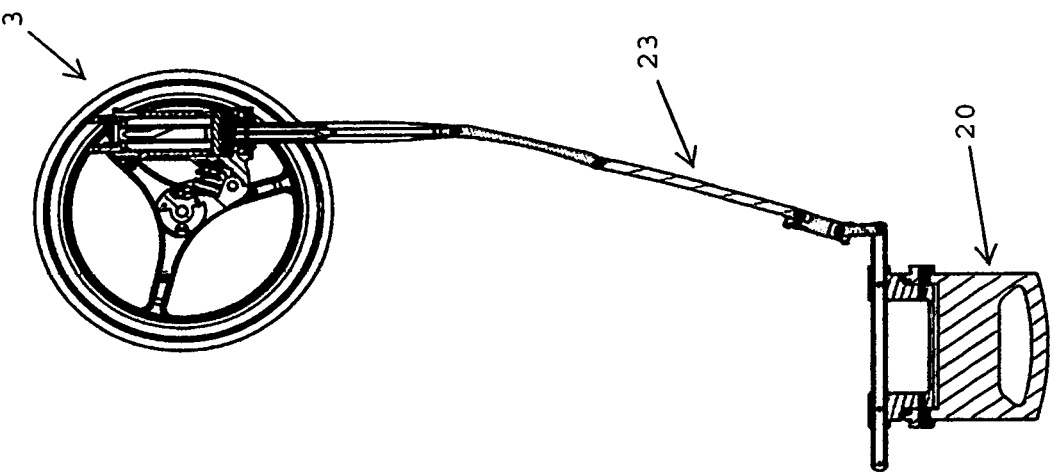
FIGS. 11a to 11c are sectional views of elements of the wheel folding mechanism of FIGS. 8 to 10.
Figure 11B:
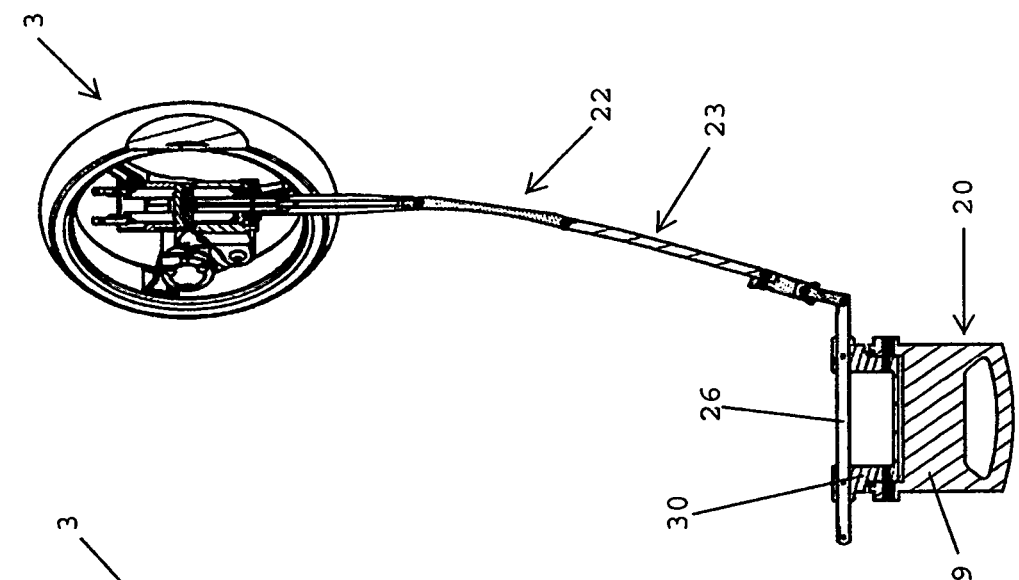
Figure 11A:
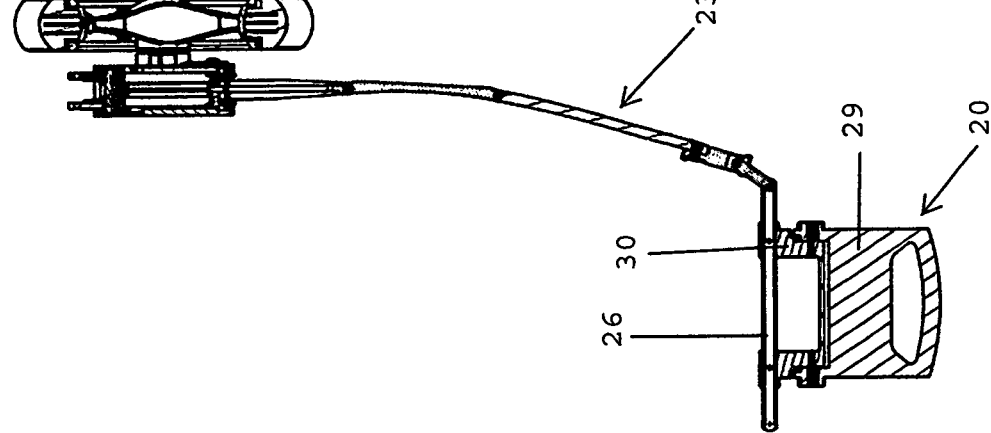

As can be seen from FIGS. 5 to 7, in greater detail from FIGS. 8 to 11, cart 1 further comprises a folding mechanism 19 for folding the two back wheels 3 and the two front wheels 4 simultaneously from the operative or drive position shown in FIGS. 1 to 4 into a stow position shown in FIG. 7. Folding mechanism or device 19 comprises an operating handle 20 separate from the upper carrier frame 5 such that the two back wheels 3 and the two front wheels 4 may be folded into the stow position independently of the collapsing mechanism 12 for bringing the (upper) carrier frame 5 into the collapsed position. The operating handle 20 is arranged at a front end of the bottom frame 2, between two front wheels 4. Additionally, FIGS. 5-7 show a transverse mounting connector 40, which is arranged at the bottom of frame 2. The mounting connector 40 rotationally supports the transverse rod 26 between the drive position (see FIG. 8A) and stow position (see FIG. 8D).

According to FIG. 5, cart 1 is arranged in an upright position, in which front wheels 4 and back wheels 3 are lifted off a level ground. For supporting cart 1 in the upright position, two foot elements 21 are arranged on the rear transverse frame member g, The foot elements 21 may be extensions of lateral frame members 8. In this position, front wheels 4 and back wheels 3 may be arranged in parallel to each other.

According to FIG. 6, front wheels 4 may be pivoted into an intermediate folding position about an axis essentially perpendicular to the bottom frame 2 (i.e. a vertical axis with respect to the drive position on the ground as shown in FIGS. 1, 2). In the intermediate folding position, front wheels 4 are arranged essentially perpendicularly to back wheels 3.

According to FIG. 7, front wheels 4 are pivoted about transverse axes perpendicular to the longitudinal axis of cart 1 by approximately 90 degrees. At the same time, back wheels 3 are pivoted about axes essentially parallel to the longitudinal axis of cart 1 by approximately 90 degrees. In this way, front wheels 4 and back wheels 3 are arranged in the stow position shown in FIG. 7, in which front wheels 4 and back wheels 3 lie flat at the underside of bottom frame 2.

As can be seen from FIGS. 8 to 11, the wheel operating handle 20 is a push-and-pull handle being linearly movable along the main horizontal plane of the bottom frame 2. The folding mechanism 19 comprises a force transmitting device 22 housed inside the bottom frame 2. In the shown embodiment, force transmitting device 22 comprises one tie rod 23 in each lateral frame member 8 of bottom frame 2. The tie rods 23 are multi-part in the shown embodiment. The opposite ends of tie rods 23 are connected to the operating handle 20 and back wheels 3, respectively. The folding mechanism 19 further comprises one sleeve element 24 around each lateral frame member 8. The sleeve elements 24 are connected to back wheels 3. Each sleeve element 24 has a guide rail 25 with sections inclined to the direction of the linear movement of tie rods 23. Sliding elements 31 are rigidly connected to ends of tie rods 23 and slide along first guide rails 25 of sleeve elements 24. In this way, an actuation of the wheel operating handle 20 is transferred into the swiveling or pivoting motion of the two back wheels 3 into the stow position.

As can be seen from FIGS. 8 to 11, the push-and-pull wheel operating handle 20 is mounted on a transverse rod 26 extending perpendicularly to the direction of the pushing or pulling of the push-and-pull operating handle 20. The folding mechanism 19 further comprises an intermediary member 27 arranged between the operating handle 20 and the front wheel 4 (see FIGS. 8a to 8d). The intermediary member 27 has a second guide rail 28 which accommodates a slider formed by transverse rod 26. In this way, movement of the operating handle 20 transfers a swiveling or pivoting motion to the transverse rod 26 and correspondingly moves the front wheel 4 into the stow position.

As can be seen particularly from FIGS. 8a to 8d, the push-and-pull operating handle 20 comprises a grasp or handhold member 29 and a mounting member 30 mounted on the transverse rod 26 of bottom frame 2. The handhold member 29 is pivotably mounted on the mounting element 30.

It is appreciated that any alternative embodiment components may be mixed and matched within the spirit of the invention, and that the upper carrier frame may be entirely eliminated, using the bottom carrier frame alone for a wide array of cargo carrying uses, and that the upper carrier frame may be used for golf, game or other miscellaneous types of cargo retaining activities, besides for baby stroller uses.

What is claimed is:

1. A foldable wheeled carrier device comprising a bottom frame forming a perimeter and a side elevational profile, at least two rear wheels and at least one front wheel movably mounted to the bottom frame, each wheel including a central axis of rotation, and having an operative and stowed position, an upper carrier frame movably mounted to the bottom frame including a carrying element, and a dual action wheel folding apparatus interconnected to each of the wheels which synchronously moves the at least two rear wheels and the at least one front wheel between the operative and stowed positions, comprising a movable push-pull grasp separate from the carrier bottom frame and the wheels, interconnected to the bottom frame and to the at least one front wheel by a front wheel transverse mounting rod, and the movement of the grasp further translates motion through a rear wheel transverse connector to the rear wheels through tie rods incorporated in the bottom frame, and in a first, operative position the grasp is moved inwards, which positions each of the rear wheels and the at least one front wheel orthogonally to the bottom frame providing rolling support, and in a second, stowed position the grasp is moved outwards sweeping each rear wheel and the at least one front wheel through an angle positioning each wheel parallel with, and closely adjacent to the bottom frame underside, with each wheel's axis of rotation within the perimeter and side elevational profile of the bottom cart frame.

2. A device in accordance with claim 1 wherein the upper carrier frame carrying element, in a first, operative position, forms at least one children's seat that accommodates at least one child, and in a second, stowed position the carrying element and the upper carrier frame is collapsed, substantially parallel with the bottom frame.

3. A device in accordance with claim 1 wherein the upper carrier frame carrying element in a first, operative position retains cargo.

4. A device in accordance with claim 1 wherein the at least two rear wheels and the at least one front wheel, occupy a common plane when in the second, stowed position.

5. A device in accordance with claim 1 wherein the upper carrier frame carrying element is movable from an operative carrier frame carrying position, to a collapsed, stowed upper carrier frame position, independently of actuation of the wheel folding apparatus.

6. A device in accordance with claim 1 wherein the wheel folding apparatus interconnected components between the grasp and the rear wheels include tie rods at least partly housed within the bottom frame perimeter, transmitting synchronous motion between the grasp movement and the at least two rear wheels respectively, moving the rear wheels between the operative and stowed positions.

7. A device in accordance with claim 1, wherein the wheel folding apparatus comprises sleeve elements interconnected to the at least two rear wheels, the sleeve elements having guide rails with sliding elements connected to the tie rods, transmitting synchronous motion between the grasp movement and the at least two rear wheels respectively, particularly causing the movement of the rear wheels between their operative and stowed positions.

8. A device in accordance with claim 1, wherein at least one foot element mounted along a portion of the rear of the bottom frame, retains the bottom frame of the device in an upright position vertical in relation to a rolling surface.

9. A device in accordance with claim 1, wherein the wheel folding apparatus grasp is mounted on a front wheel transverse mounting connector joined to the bottom frame, extending substantially perpendicular to the direction of the push-pull grasp motion, the transverse mounting connector is cylindrical within its interior, housing a second shaped transverse rod, and inward and outward movement of the grasp further translates pivoting motion through the transverse rod to the at least one front wheel, effectuating pivoting movement of the at least one front wheel between the operative and stowed positions.

10. A device in accordance with claim 1, wherein the wheel folding apparatus includes an intermediary member mounted along a front wheel transverse mounting connector, interconnecting the grasp, the bottom frame, and the at least one front wheel, wherein the intermediary member includes a guide rail for guiding a shaped transverse rod incorporated within the transverse mounting connector, and movement inwards and outwards of the grasp translates motion to the at least one front wheel which synchronously moves the at least one front wheel between the operative and stowed positions.

11. A device in accordance with claim 1 wherein, in the second stowed position, the at least two rear wheels each occupy a common plane, and provide a second, rolling support position to the substantially vertically oriented folded and stowed wheeled carrier device.

12. A foldable wheeled carrier device comprising a bottom frame including a least two substantially parallel side portions with a front and rear, joined at least near to the front by a dual action grasp, and a front and rear wheel transverse mounting connector portion, forming a bottom frame periphery, and a side elevational profile, at least a pair of rear wheels, each of the pair mounted near the rear of the bottom frame side portions, and at least one front wheel also movably mounted to the bottom frame front transverse mounting connector portion, each wheel including a central axis of rotation and having an operative position wherein all wheels are positioned orthogonally to the bottom frame providing rolling support and a stowed position wherein all wheels are substantially parallel with the bottom frame and within the bottom frame's side elevational profile, an upper carrier portion movably mounted to the bottom frame including a carrying element, and a wheel folding apparatus interconnected to each of the wheels which synchronously moves the at least two rear wheels and the at least one front wheel between the operative and stowed positions, comprising a manually movable grasp interconnected to the bottom frame and to the at least one front wheel by a front wheel pivoting transverse rod connected to the at least one front wheel, and by a rear wheel transverse connector controlling a pair of tie rods interconnected to the at least two rear wheels, and push-pull movement of the dual action grasp translates motion to the at least one front wheel and to the rear wheels to move them between the operative and stowed positions.

13. A device in accordance with claim 12 wherein the grasp motion is a push-pull motion linearly in relation to the front transverse mounting connector.

14. A device in accordance with claim 12 wherein the upper carrier portion carrying element is movable from an operative carrier portion carrying position, to a collapsed, stowed upper carrier portion position, independently of actuation of the wheel folding apparatus.

15. A device in accordance with claim 12, wherein the upper carrier portion carrying element forms child seating which is selectively removable from the upper carrier portion, and in a first, operative child retaining position the carrying element is mounted to the upper carrier portion and upwardly positioned in relation to the bottom carrier frame, and in a second, removed position the child seating carrying element is detached from the upper carrying portion and includes manual carrying means.

16. A device in accordance with claim 12, wherein the upper carrier portion carrying element includes a collapsed, stowed position in which the carrying element is mounted to the upper carrier portion, positioned parallel with, and closely adjacent to the bottom frame, forming a combined side elevational profile with the bottom cart frame.

17. A foldable wheeled carrier device comprising a bottom frame including a least two substantially parallel side portions with a front and rear, joined at least near to the front by a dual action grasp and a front and rear wheel transverse mounting connector portion, forming a bottom frame perimeter and a side elevational profile, at least a pair of rear wheels, each of the pair mounted near the rear of the bottom frame side portions, and at least one front wheel movably mounted to the bottom frame front wheel transverse mounting connector portion, each wheel including a central axis of rotation, and an operative and stowed position, and a wheel folding apparatus interconnected to each of the wheels which synchronously moves the at least two rear wheels and the at least one front wheel between the operative and stowed positions, comprising a manually movable grasp interconnected to the bottom frame and to the at least one front wheel by a pivoting transverse rod connected to the at least one front wheel, and by a rear wheel transverse connector controlling a pair of tie rods interconnected to the at least two rear wheels, and push-pull movement of the dual action grasp translates motion to the at least one front wheel and to the rear wheels to move them between the operative and stowed positions.

18. A device in accordance with claim 17, wherein a collapsible upper carrier portion is movably mounted to the bottom frame and includes a carrying element, and in a first, operative position is upwardly positioned in relation to the bottom frame, and in a second, stowed position is stowed substantially parallel with, and adjacent to, the bottom carrier frame.

19. A device in accordance with claim 17, wherein the wheeled carrier device, in the first, operative position, retains cargo.

* * * * *